United States Patent [19]
Akiba et al.

[11] Patent Number: 5,982,960
[45] Date of Patent: Nov. 9, 1999

[54] OPTICAL WAVELENGTH MULTIPLEXER/DEMULTIPLEXER

[75] Inventors: Kenji Akiba, Fukushima; Kimio Inaba, Ibaraki, both of Japan

[73] Assignee: Hitachi Cable, Ltd., Tokyo, Japan

[21] Appl. No.: 08/919,612

[22] Filed: Aug. 28, 1997

[30] Foreign Application Priority Data

Jan. 22, 1997 [JP] Japan .................................. 9-009756

[51] Int. Cl.⁶ .................................................. G02B 6/28
[52] U.S. Cl. ................................ 385/24; 385/37; 359/124
[58] Field of Search .............................. 385/24, 14, 43, 385/46, 16, 17, 37; 359/124–127, 131, 110, 130, 161, 115

[56] References Cited

U.S. PATENT DOCUMENTS

| | | | |
|---|---|---|---|
| 4,758,060 | 7/1988 | Jaeger et al. | 385/12 |
| 5,414,548 | 5/1995 | Tachikawa et al. | 359/130 |
| 5,617,234 | 4/1997 | Koga et al. | 359/131 |
| 5,701,371 | 12/1997 | Ishida | 385/17 |
| 5,841,919 | 11/1998 | Akiba et al. | 385/37 |

FOREIGN PATENT DOCUMENTS 7-117612  12/1995  Japan .

Primary Examiner—Akm E. Ullah
Attorney, Agent, or Firm—McDermott, Will & Emery

[57] ABSTRACT

An optical wavelength multiplexer/demultiplexer has an input channel waveguide, an input slab waveguide, an arrayed-waveguide grating having N channel waveguides, an output slab waveguide, and N output channel waveguides. Each output channel waveguide is provided with an outwardly tapered end. Each tapered end has a width at its end surface which becomes larger as the output channel waveguide becomes distant from the symmetrical axis of the output slab waveguide. The loss differences suffered by each separated signal may be substantially reduced.

6 Claims, 5 Drawing Sheets

OPTICAL WAVELENGTH MULTIPLEXER/DEMULTIPLEXER

FIELD OF THE INVENTION

This invention relates to an optical wavelength multiplexer/demultiplexer utilizing an arrayed-waveguide grating, and more particularly to, an optical wavelength multiplexer/demultiplexer in which each optical signal emerging from each output channel waveguide has a reduced loss difference from each other.

BACKGROUND OF THE INVENTION

In an optical communications field, wavelength-division multiplexing (WDM) transmission systems have been studied for enhancing information capacity. In these systems, a plurality of optical signals at different wavelengths which are spaced by about 1 nm are transmitted over a single optical fiber. For this purpose, an optical wavelength multiplexer/demultiplexer is an important component which plays a significant roll to combine or separate the optical signals at different wavelengths. Particularly, one of the most promising optical wavelength multiplexer/demultiplexers for such use is one which utilizes an arrayed-waveguide grating, which may increase the number of multiplexed signals with relatively narrow wavelength spacings.

One of conventional optical wavelength multiplexer/demultiplexers is disclosed in Japanese Published Patent Application No. 4-163406.

The conventional optical wavelength multiplexer/demultiplexer comprises at least one input channel waveguide for receiving wavelength division multiplexed signals, the wavelength division multiplexed signal comprising a plurality of signals having a predetermined wavelength difference from each other, an input slab waveguide for expanding the wavelength division multiplexed signals coupled from the input channel waveguide into the input slab waveguide, an arrayed-waveguide grating comprising a plurality of channel waveguides, each channel waveguide having a predetermined length difference in accordance with the predetermined wavelength difference, so that each signal at different wavelength coupled to and traveling over each channel waveguide is provided with a phase difference from each other in accordance with the predetermined length difference, an output slab waveguide for focusing the signals at different wavelength coupled from the channel waveguides into a plurality of predetermined positions in accordance with the predetermined wavelength difference, respectively, and a plurality of output channel waveguides, an input end of each output channel waveguide being arranged at each predetermined position, so that each separated signal at each wavelength is coupled to each output channel waveguide and emerges from an output end thereof.

In operation, the wavelength division multiplexed signals coupled into the input channel waveguide, expand into the input slab waveguide by diffraction. Then, the expanded signals are distributed to the channel waveguides of the arrayed-waveguide grating, which are arranged radially along an arc boundary of the input slab waveguide. On the other hand, as each channel waveguide of the arrayed-waveguide grating has a predetermined waveguide length difference, each signal, after traveling over each channel waveguide to the output slab waveguide, has a predetermined phase difference according to its waveguide length difference. Since the phase difference depends on the wavelength of the signal, each signal at different wavelength is focused on a different position along the arc boundary of the output slab waveguide due to a lens effect. As a result, separated signals each having a different wavelength are received by the plurality of output channel waveguides and emerge therefrom, respectively.

In the conventional optical wavelength multiplexer/demultiplexer, however, there is a disadvantage in that each separated signal emerging from each output channel waveguide suffers a different loss from others in a relatively large amount when they are separated. That is to say, as the output channel waveguide is arranged at a position which is more distant from a symmetrical axis of the output slab waveguide, the loss for the signal emerging therefrom becomes higher. It is important for an optical wavelength multiplexer/demultiplexer to attain an uniform overall transmission loss for each separated signal at different wavelength.

SUMMARY OF THE INVENTION

Accordingly, it is an object of the invention to provide an optical wavelength multiplexer/demultiplexer in which each separated signal emerging from each output channel waveguide has a reduced loss difference from each other.

It is a further object of the invention to provide an optical wavelength multiplexer/demultiplexer in which transmission loss for each separated signal at different wavelength is adjusted to be substantially equal.

According to the first feature of the invention, an optical wavelength multiplexer/demultiplexer incorporated in a substrate, comprises:

at least one input channel waveguide for receiving wavelength-division multiplexed signals, the wavelength division multiplexed signals comprising a plurality of signals having a predetermined wavelength difference from each other;

an input slab waveguide for expanding the wavelength division multiplexed signals coupled from the input channel waveguide into the input slab waveguide;

an arrayed-waveguide grating comprising a plurality of channel waveguides, each channel waveguide having a predetermined length difference in accordance with the predetermined wavelength difference, so that each signal at different wavelength is provided with a phase difference from each other in accordance with the predetermined length difference; an output slab waveguide for focusing each signal at different wavelength emerging from the channel waveguides into a plurality of predetermined positions in accordance with the predetermined wavelength difference, respectively; and a plurality of output channel waveguides, an input end of each the output channel waveguide being arranged at each predetermined position so that each separated signal is coupled to each output channel waveguide and emerges from an output end thereof;

wherein a loss of each output channel waveguide is selected in accordance with loss differences between the separated signals coupled into the output channel waveguides.

BRIEF DESCRIPTION OF THE DRAWINGS

The invention will be explained in more detail in conjunction with the appended drawings, wherein.

DESCRIPTION OF THE PREFERRED EMBODIMENTS

Before explaining an optical wavelength multiplexer/ demultiplexer in the preferred embodiment, the aforementioned conventional optical wavelength multiplexer/ demultiplexer will be explained in FIGS. 1, 2 and 3.

Figure 1:
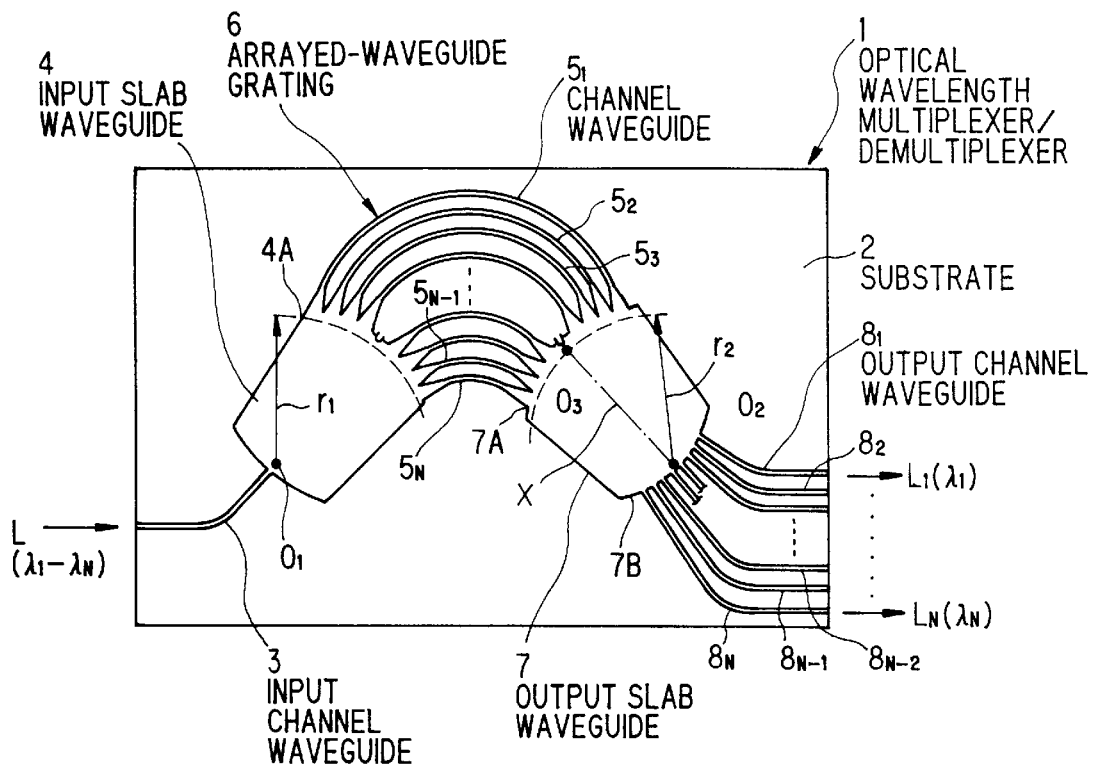
FIG. 1 is a plane view showing a conventional optical wavelength multiplexer/demultiplexer.

FIG. 1 shows the conventional optical wavelength multiplexer/demultiplexer. The optical wavelength multiplexer/demultiplexer 1 comprises an input channel waveguide 3, an input slab waveguide 4, an arrayed-waveguide grating 6 comprising N channel waveguides $5_1$–$5_N$, an output slab waveguide 7, and N output channel waveguides $8_1$–$8_N$. All these elements are incorporated in a substrate 2 and preferably covered with a cladding layer 12, as shown in FIG. 2, to form a single optical wavelength multiplexer/demultiplexer 1. The substrate 1 may be made of $SiO_2$, while the input channel waveguide 3, the input slab waveguide 4, the arrayed-waveguide grating 6, the output slab waveguide 7 and output channel waveguides $8_1$–$8_N$ are made of $TiO_2$—$SiO_2$. Moreover, the cladding layer 12 may be made of $B_2O_3$—$P_2O_5$—$SiO_2$.

The input channel waveguide 3 has a rectangular cross-section, and receives wavelength-division multiplexed signals L at wavelength $\lambda_1$–$\lambda_N$ from an input end thereof through an optical fiber (not shown), a wavelength spacing of the signals at adjacent wavelengths is $\Delta\lambda$.

The input slab waveguide 4 has an arc boundary 4A which has a radius of curvature of $r_1$, and its center $o_1$ in the vicinity of a connecting portion of the input channel waveguide 3 to the input slab waveguide 4, so that the multiplexed signals L are expanded into the input slab waveguide 4 toward the arc boundary 4A by diffraction effect.

Each channel waveguide $5_1$–$5_N$ of the arrayed-waveguide grating 6 has a rectangular cross-section, and differs in length from a adjacent channel waveguide by a predetermined amount in accordance with the wavelength spacing $\Delta\lambda$. Input ends of the channel waveguides $5_1$–$5_N$ of the arrayed-waveguide grating 6 are arranged radially along the arc boundary 4A of the input slab waveguide 4. The expanded multiplexed signals L are distributed to the channel waveguides $5_1$–$5_N$. then a phase difference of a predetermined amount in accordance with the waveguide length difference is given to each signal at different wavelength as it is transmitted through each channel waveguide $5_1$–$5_N$.

The output slab waveguide 7 has an arc boundary 7A which has a radius of curvature of $r_2$, and its center $o_2$ in the vicinity of the center of an opposite arc boundary 7B where the output channel waveguides $8_1$–$8_N$ are connected to the output slab waveguide 7, so that each signal $L_1$–$L_N$ at different wavelength $\lambda_1$–$\lambda_N$ is focused on a different position along the arc boundary 7B of the output slab waveguide 7 to be coupled into each output channel waveguide $8_1$–$8_N$, based on a lens effect in accordance with the phase difference thereof.

Each output channel waveguide $8_1$–$8_N$ has a rectangular cross-section, and input ends thereof are arranged radially along the arc boundary 7B which has its center $o_3$ in the vicinity of the center of the arc boundary 7A. Therefore, the signals $L_1$–$L_N$ at different wavelengths $\lambda_1$–$\lambda_N$ are selectively received by the output channel waveguides $8_1$–$8_N$ in accordance with their wavelengths and emerge from their output ends, respectively.

Figure 2:
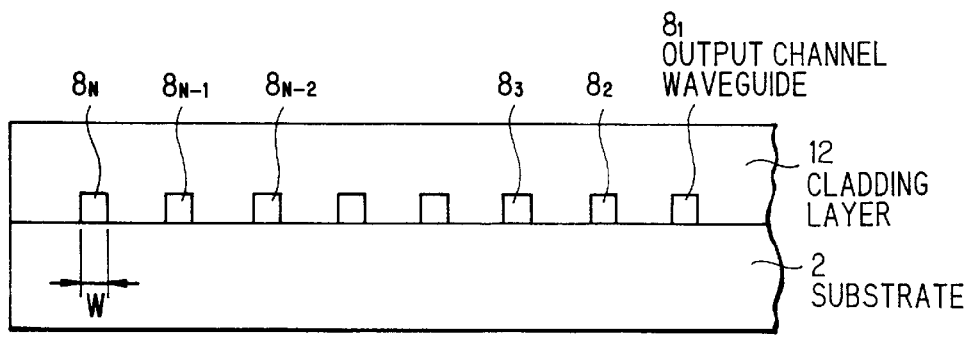
FIG. 2 is a partial side view, on an enlarged scale, of a portion of output ends of output channel waveguides in the conventional optical wavelength multiplexer/demultiplexer shown in FIG. 1.

FIG. 2 shows the vicinity of output ends of the output channel waveguides $8_1$–$8_N$. Each output channel waveguide $8_1$–$8_N$ has the same width W and uniformly spaced by a predetermined spacing so as to be connected to an input end of an optical fiber (not shown).

In operation, the wavelength-division multiplexed signal L, which is coupled into the input channel waveguide 4, expands into the input slab waveguide 4 by diffraction. Then, the expanded signals are distributed to the channel waveguides $5_1$–$5_N$ of the arrayed-waveguide grating 6. In this case, since each channel waveguide $5_1$–$5_N$ of the arrayed-waveguide 6 has a predetermined waveguide length difference, each signal at different wavelength, after traveling over each channel waveguide $5_1$–$5_N$, has a predetermined phase difference according to its waveguide length difference. Since the phase difference depends on the wavelength of the signal, each signal at different wavelength is focused on a different position along the arc boundary 7B of the output slab waveguide 7 due to a lens effect. For example, the signal at wavelength $\lambda_1$, which is distributed into and emerges from the channel waveguides $5_1$–$5_N$, is focused at the input end of the output channel waveguide $8_1$. In the same way, the signals at $\lambda_2$–$\lambda_N$ are focused at the input ends of the output channel waveguides $8_2$–$8_N$, respectively. As a result, signals $L_1$–$L_N$ at different wavelengths $\lambda_1$–$\lambda_N$ are selectively received by the output channel waveguides $8_1$–$8_N$ and emerges from their output ends, respectively.

In the conventional optical wavelength multiplexer/ demultiplexer, as explained before, there is a disadvantage in that each separated signal $L_1$–$L_N$ emerging from each output channel waveguide $8_1$–$8_N$ suffers a different loss from others in a relatively large amount. As the output channel waveguide becomes more distant from a symmetrical axis X of the output slab waveguide 7, the loss for the signal traveling through and emerging from the output channel waveguide becomes higher.

Figure 3:
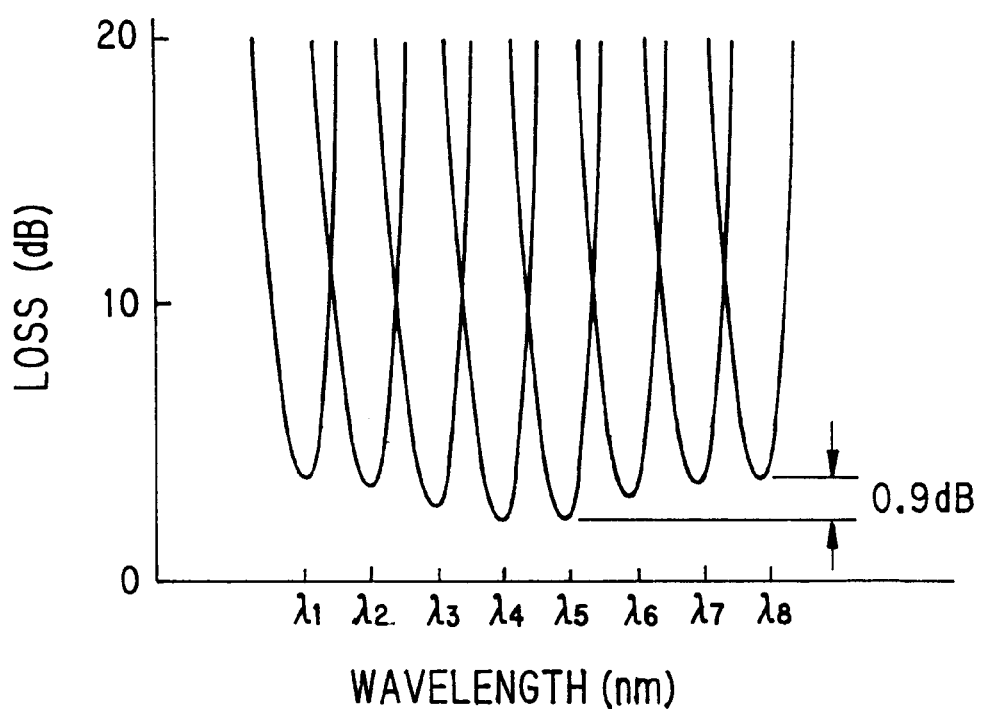
FIG. 3 is a graph showing loss relative to wavelength characteristics of the conventional optical wavelength multiplexer/demultiplexer.

FIG. 3 shows loss relative to wavelength characteristics in the conventional optical wavelength multiplexer/ demultiplexer 1, wherein eight output channel waveguides $8_1$–$8_8$(N=8) emerge eight signals $L_1$–$L_8$ at eight wavelengths $\lambda_1$–$\lambda_8$, respectively. A specific refractive index difference between the output channel waveguides and the cladding layer 12 is 0.8%. As is indicated in FIG. 3, a loss difference between the signals $L_4(\lambda_4)$, $L_5(\lambda_5)$ emerging from the output channel waveguides $8_4$, $8_5$ which are close to the symmetrical axis X, and the signals $L_1(\lambda_1)$, $L_8(\lambda_8)$ emerging from the output channel waveguides $8_1$, $8_8$ which are distant from the symmetrical axis X, is 0.9 dB and relatively high.

Next, an optical wavelength multiplexer/demultiplexer in the preferred embodiment will be explained in FIGS. 4 and 5, wherein like parts are indicated by like reference numerals as used in FIGS. 1 and 2.

Figure 4:
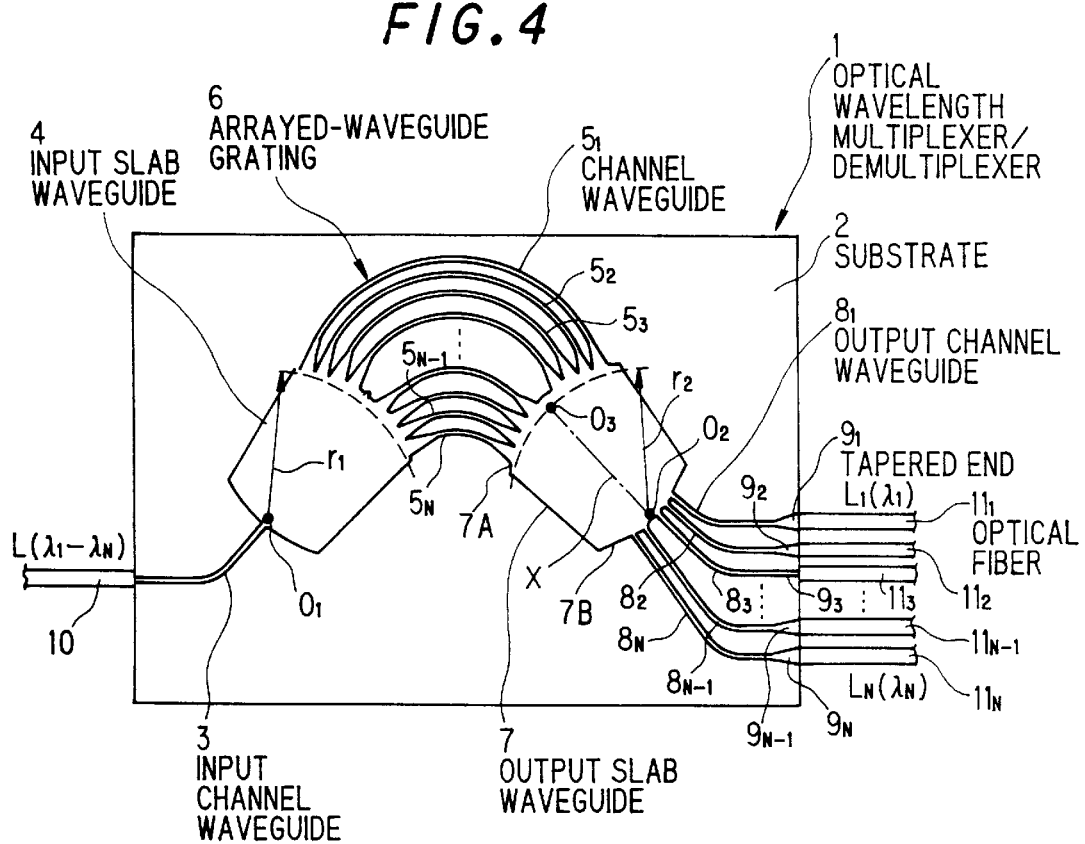
FIG. 4 is a view similar to FIG. 1, but showing an optical wavelength multiplexer/demultiplexer in a preferred embodiment according to the invention.

FIG. 4 shows the optical wavelength multiplexer/demultiplexer in the preferred embodiment according to the invention. The optical wavelength multiplexer/demultiplexer, which is similar to the conventional one shown in FIG. 1, comprises an input channel waveguide 3, an input slab waveguide 4, an arrayed-waveguide grating 6 comprising N channel waveguides $5_1$–$5_N$, an output slab waveguide 7, and N output channel waveguides $8_1$–$8_N$. In the embodiment, each output channel waveguide $8_1$–$8_N$ is provided with an outwardly tapered end $9_1$–$9_N$ at their output ends. All these elements are incorporated in a substrate 2 and preferably covered with a cladding layer 12, as shown in FIG. 5, to form a single optical wavelength multiplexer/demultiplexer 1.

Figure 5:
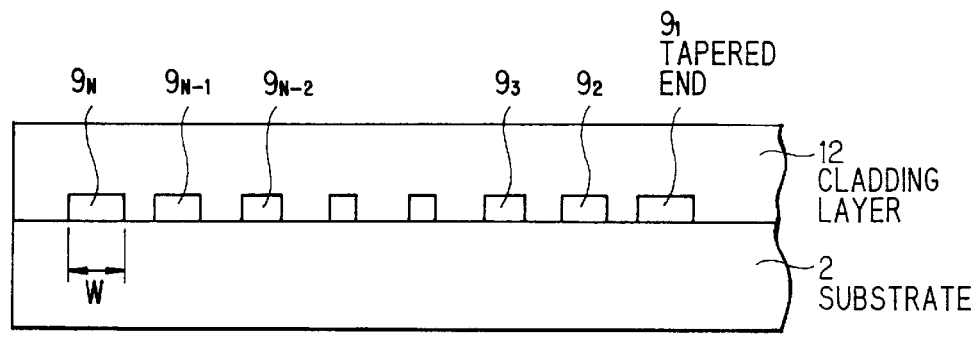
FIG. 5 is a view similar to FIG. 2, but showing a portion of output ends of output channel waveguides in the preferred embodiment shown in FIG. 4.

FIG. 5 shows the vicinity of the output ends of the output channel waveguides $8_1$–$8_N$. According to the preferred embodiment, each outwardly tapered end $9_1$–$9_N$ has a width W at its end surface which becomes larger as the output channel waveguide becomes more distant from the symmetrical axis X of the output slab waveguide 7.

Figure 6:
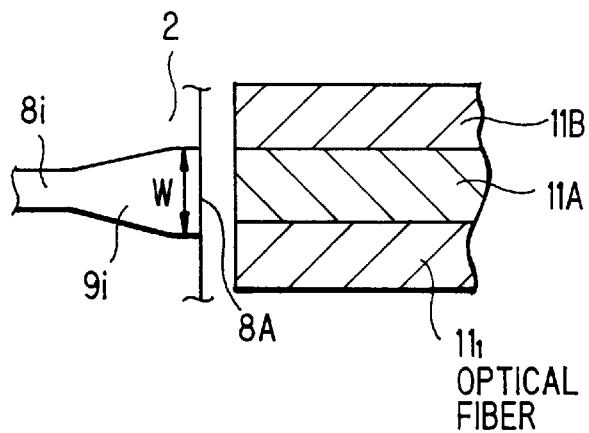
FIG. 6 is an explanatory view showing a connecting structure of an output channel waveguide to an optical fiber in the preferred embodiment according to the invention.

FIG. 6 shows a preferable connecting structure of the output channel waveguide $8i$(i=1–N) to an optical fiber $11i$(i=1–N) in the preferred embodiment. The output channel waveguide $8i$ has the outwardly tapered end $9i$(i=1–N) through which the signal Li(i=1–N) at wavelength λi (i=1–N) is coupled to the optical fiber $11i$(i=1–N). The optical fiber 11 comprises a core 11A and a cladding layer 11B. The width W of the tapered end $9i$ at its end surface 8A is designed in such a way that, for example, it becomes larger in a range between 4–10 μm as the output channel waveguide $8i$ becomes more distant from the symmetrical axis X of the output slab waveguide 7, provided the specific refractive index difference between the output channel waveguide $8i$ and the cladding layer 12 is 0.75%.

Figure 7:
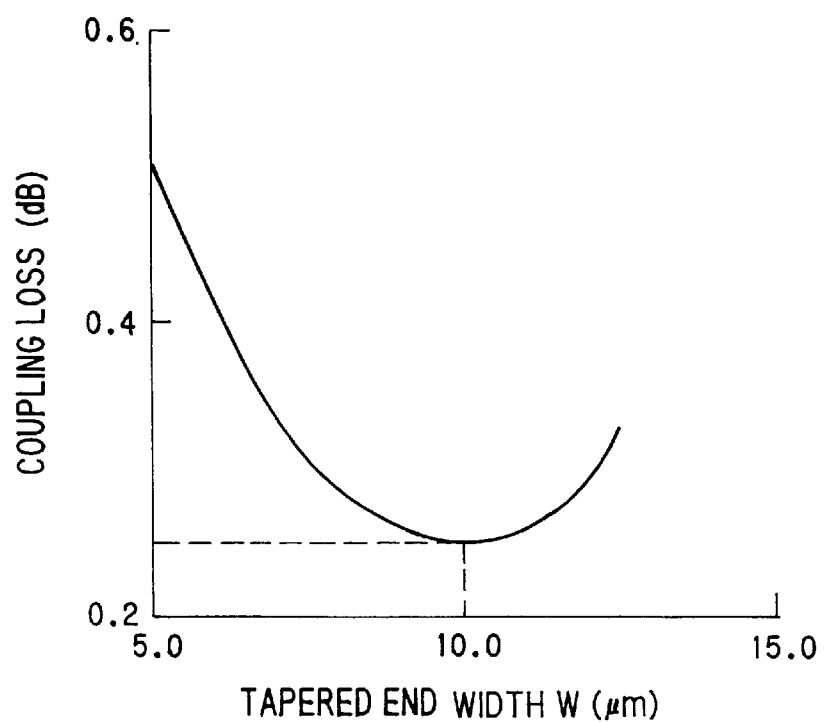
FIG. 7 is a graph showing characteristics of coupling loss relative to a width of a tapered end of the output channel waveguide in accordance with the invention.

FIG. 7 shows characteristics of coupling loss between the output channel waveguide $8i$ and the optical fiber $11i$ relative to the width W of the tapered end $9i$, wherein the output channel waveguide $8i$ is 6 μm wide and 6 μm thick. A specific refractive index difference between the output channel waveguide $8i$ and the cladding layer 12 is 0.75%. The optical fiber $11i$ has a mode field diameter of 9.7 μm. As shown in FIG. 7, the coupling loss becomes lower as the width of the tapered end becomes larger, then it becomes minimum at the width of 10.0 μm. Therefore, according to the preferred embodiment, the output channel waveguides are designed in such a way that the coupling loss between the output channel waveguide $8i$ and the optical fiber $11i$ becomes lower, as the output channel waveguide $8i$ becomes more distant from the symmetrical axis X of the output slab waveguide 7. The coupling loss, however, becomes higher when the width W is larger than 10 μm (i.e., W>10 μm).

In operation, the wavelength-division multiplexed signal L, which is coupled into the input channel waveguide 4 through an optical fiber 10, expands into the input slab waveguide 4 by diffraction. Then, the expanded signals are distributed to the channel waveguides $5_1$–$5_N$ of the arrayed-waveguide grating 6. Since each channel waveguide $5_1$–$5_N$ of the arrayed-waveguide 6 has a predetermined waveguide length difference, each signal at different wavelength, after traveling over each channel waveguide $5_1$–$5_N$, has a predetermined phase difference according to its waveguide length difference. Since the phase difference depends on the wavelength of the signal, each signal at different wavelength is focused on a different position along the connecting boundary 7B of the output slab waveguide 7 due to a lens effect. For example, the signal at wavelength $\lambda_1$ distributed into and emerging from the channel waveguides $5_1$–$5_N$, is focused at the input end of the output channel waveguide $8_1$. In the same way, the signals at wavelengths $\lambda_2$–$\lambda_N$ are focused at the input ends of the output channel waveguides $8_2$–$8_N$, respectively. As a result, separated signals $L_1$–$L_N$ at different wavelength $\lambda_1$–$\lambda_N$ are selectively received by the output channel waveguides $8_1$–$8_N$ and emerge from their output ends through the tapered ends $9_1$–$9_N$ to be coupled to optical fibers $11_1$–$11_N$, respectively.

Although each separated signal Li–$L_N$ coupled into each output channel waveguide $8_1$–$8_N$ suffers a different loss from other when it is separated from the multiplexed signals, i.e., the loss becomes higher as the output channel waveguide becomes more distant from the symmetrical axis X of the output slab waveguide 7, such loss differences may be reduced due to the different coupling losses created by the varied widths W of the tapered ends $9_1$–$9_N$ in accordance with the invention. Because the coupling loss becomes lower as the output channel waveguide becomes more distant from the symmetrical axis X of the output slab waveguide 7, the loss differences may be adjusted to be substantially equal and the separated signals $L_1$–$L_N$ with reduced loss differences emerge from the output channel waveguides $8_1$–$8_N$ and are coupled into the optical fibers $11_1$–$11_N$, respectively.

Next, loss relative to wavelength characteristics in the optical wavelength multiplexer/demultiplexer 1 in the preferred embodiment will be discussed below, wherein eight channel waveguides $8_1$–$8_8$(N=8) emerge eight signals $L_1$–$L_8$ at eight wavelengths $\lambda_1$–$\lambda_8$, respectively. Each output channel waveguide $8_1$–$8_8$ is 6 μm wide and 6 μm thick, and a specific refractive index difference between each output channel waveguide $8_1$–$8_8$ and the cladding layer 12 is 0.75%. The optical fiber $11i$ has a mode field diameter of 9.7 μm.

In this case, the width W of the tapered end of each output channel waveguide $8_1$–$8_8$ is selected as shown in TABLE 1. For example, the tapered ends $9_1$, $9_8$ of the output channel waveguides $8_1$, $8_8$ which are more distant from the symmetrical axis X of the output slab waveguide 7 are 10 μm wide at their end surfaces, while the tapered ends $9_1$, $9_8$ of the output channel waveguides $8_4$, $8_5$ which are closer to the symmetrical axis X of the output slab waveguide 7 are 5 μm wide.

TABLE 1

| OUTPUT CHANNEL WAVEGUIDE | TAPERED END WIDTH (μm) |
|---|---|
| $8_1$ | 10.0 |
| $8_2$ | 9.0 |
| $8_3$ | 7.0 |
| $8_4$ | 5.0 |
| $8_5$ | 5.0 |
| $8_6$ | 7.0 |
| $8_7$ | 9.0 |
| $8_8$ | 10.0 |

Figure 8:
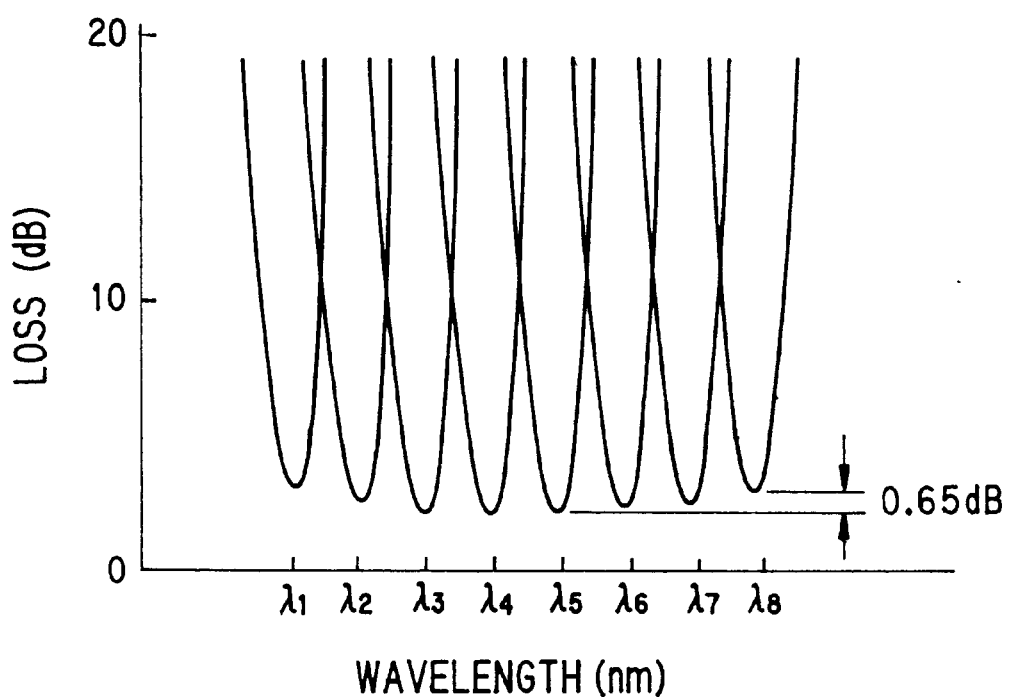
FIG. 8 is a graph similar to FIG. 3, but showing loss relative to wavelength characteristics in the preferred embodiment according to the invention.

FIG. 8 shows loss relative to wavelength characteristics in the optical wavelength multiplexer/demultiplexer 1 in the preferred embodiment, wherein eight channel waveguides $8_1$–$8_8$(N=8) emerge eight signals $L_1$–$L_8$ at eight wavelengths $\lambda_1$–$\lambda_8$, respectively.

As is indicated in FIG. 8, a loss difference between the signals $L_4(\lambda_4)$, $L_5(\lambda_5)$ from the output channel waveguides $8_4$, $8_5$ which are close to the symmetrical axis X, and the signals $L_1(\lambda_1)$, $L_8(\lambda_8)$ from the output channel waveguides $8_1$, $8_8$ which are distant from the symmetrical axis X, is as low as 0.65 dB, which is improved from 0.9 dB of the conventional one.

In the preferred embodiment, the substrate may be a glass substrate, a semiconductor substrate or the like. The waveguides and the cladding layer may be made of properly selected transparent materials such as glass, semiconductor, or the like. For example, the substrate may be made of $SiO_2$, while the input channel waveguide, the input slab waveguide, the arrayed-waveguide grating, the output slab waveguide and the output channel waveguides are made of $TiO_2$—$SiO_2$, and the cladding layer may be made of $B_2O_3$—$P_2O_5$—$SiO_2$. Moreover, if a buffer layer is formed between the substrate and the waveguides, the substrate may be made of Si substrate, while the buffer layer, the waveguide and cladding layer may be made of $SiO_2$, $TiO_2$—$SiO_2$, and $B_2O_3$—$P_2O_5$—$SiO_2$, respectively.

Besides selecting the width of each tapered end, the loss differences may be reduced in other ways, for example, by properly selecting a light coupling efficiency of each output channel waveguide and an output optical fiber by positioning light coupling means like a focusing lens between an end surface of each output channel waveguide and an optical fiber.

Moreover, if a plurality of signals of different wavelengths are combined at the optical wavelength multiplexer/demultiplexer according to the invention, i.e., the signals are transmitted in the opposite direction to those in the aforementioned preferred embodiment, an input loss of each input channel waveguide (i.e., each output channel waveguide in the preferred embodiment) may be properly selected in accordance with a different combining loss suffered by each signal.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical wavelength multiplexer/demultiplexer incorporated in a substrate, comprising:

at least one input channel waveguide for receiving wavelength-division multiplexed signals, said wavelength division multiplexed signals comprising a plurality of signals having a predetermined wavelength difference from each other;

an input slab waveguide for expanding said wavelength division multiplexed signals coupled from said input channel waveguide into said input slab waveguide;

an arrayed-waveguide grating comprising a plurality of channel waveguides, each said channel waveguide having a predetermined length difference in accordance with said predetermined wavelength difference, so that each said signal at different wavelength is provided with a phase difference from each other in accordance with said predetermined length difference;

an output slab waveguide for focusing each said signal at different wavelength emerging from said channel waveguides into a plurality of predetermined positions in accordance with said predetermined wavelength difference, respectively; and a plurality of output channel waveguides, an input end of each said output channel waveguide being arranged at each said predetermined position so that each separated signal is coupled to each said output channel waveguide and emerges from an output end thereof; wherein a loss of each said output channel waveguide is selected in accordance with loss differences between said separated signals coupled into said output channel waveguides.

2. An optical wavelength multiplexer/demultiplexer, according to claim 1, wherein: said loss of each said output channel waveguide is selected so that loss differences between said separated signals are substantially reduced.

3. An optical wavelength multiplexer/demultiplexer, according to claim 1, wherein: said output ends of said output channel waveguides differ in width with each other.

4. An optical wavelength multiplexer/demultiplexer, according to claim 3, wherein: said the width at output end of said output channel waveguide becomes larger as said output channel waveguide becomes more distant from a symmetrical axis of said output slab waveguide.

5. An optical wavelength multiplexer/demultiplexer, according to claim 3, wherein: each said output channel waveguide has an outwardly tapered end at its output end.

6. An optical wavelength multiplexer/demultiplexer, according to claim 3, wherein: said width of said output end of each said output channel waveguide is 4–11 $\mu$m, provided a specific refractive index difference between said output channel waveguides and a cladding layer covering said output channel waveguides is 0.72–0.82%.

* * * * *